Nov. 29, 1932. W. L. WRIGHT 1,889,084
FILM GUIDING MECHANISM
Filed Feb. 29, 1928
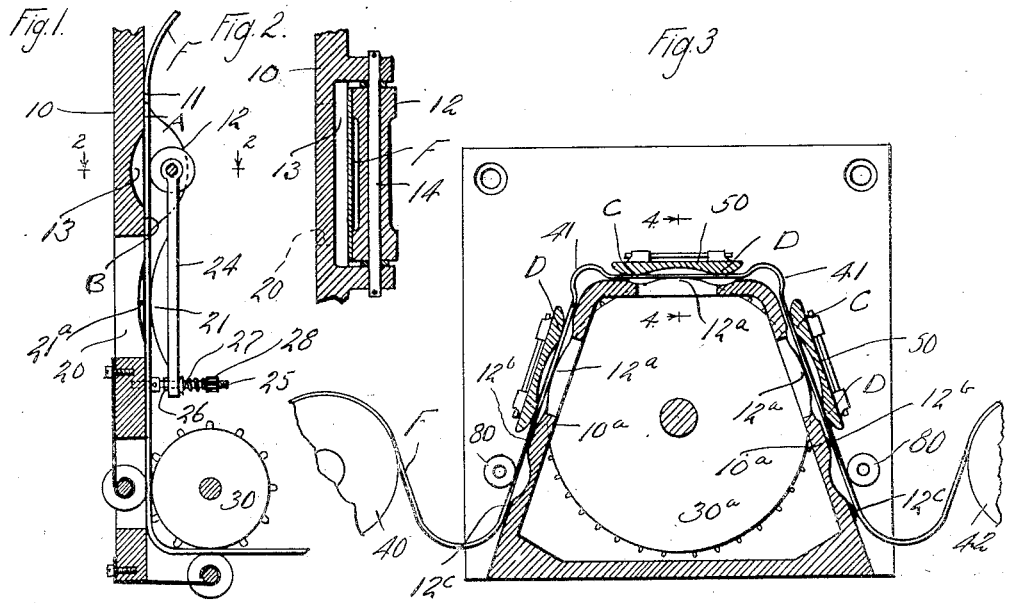
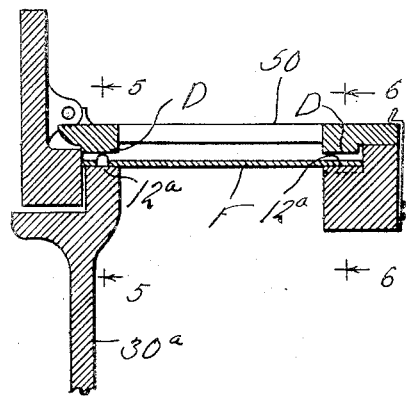
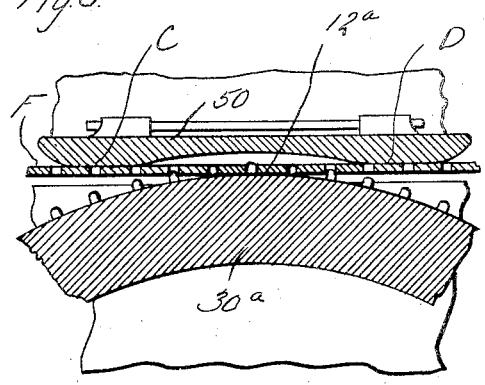
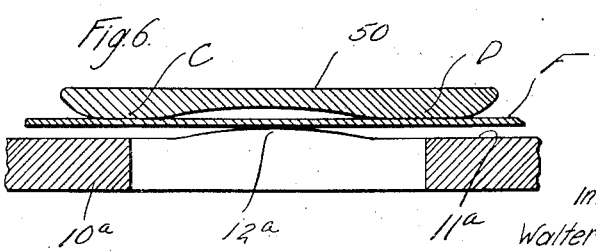
Inventor
Walter L Wright
by his Attorney Patented Nov. 29, 1932

1,889,084

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

FILM GUIDING MECHANISM

Application filed February 28, 1928. Serial No. 258,040.

This invention has to do with a film guide and it is a general object of the invention to provide a construction for handling or guiding a film at an aperture or similar part in a camera projector or other film handling apparatus.

Motion picture film in accordance with the various methods and processes incidental to its manufacture, treatment and use is guided in a definite predetermined manner with reference to one or more parts, such as apertures, etc., and is in most cases intermittently moved or operated with reference to such parts. In the apparatus commonly used for handling film of this type frictional means are provided for holding and guiding the film, such means operating to hold the film so that there is a drag or decided frictional resistance against longitudinal movement and clamping it to hold it in a flat plane at or with reference to a part such as an aperture plate, or the like.

It is a primary object of this invention to provide a film guide for properly holding and guiding a film with reference to an aperture plate, or the like, without employing frictional clamping or dragging means such as are above referred to.

It is another object of this invention to provide a film guide of the character just mentioned operable to handle films having irregularities such as patches, or the like.

Another object of this invention is to provide a film guide of the general character above referred to in which the characteristic resiliency of the film itself is in part utilized in causing the proper positioning of the film with reference to a part such as an aperture plate, or the like.

Another object of this invention is to provide a film guiding means which is accurate and reliable in operation and is without yielding or spring pressed film engaging guide shoes or other such elements.

It is a further object of this invention to provide a film guide operating to freely guide a film in a manner advantageous in connection with a film handling mechanism such as I set forth and claim in my co-pending application, entitled Film handling mechanism, filed on even date herewith, being application Serial No. 258,039.

Another object of the invention is to provide film guiding means applicable to and capable of being advantageously embodied in apparatus such as I set forth and claim in my co-pending application entitled Motion picture apparatus, issued as Patent No. 1,688,607 on October 23, 1928.

The various objects and various features of my invention will be best and more fully understood from the following detailed description of a typical form and application of the invention, throughout which description reference is had to the accompanying drawing, in which:

Figure 1 is a longitudinal sectional view of a film handling mechanism embodying the guiding means provided by this invention.

Fig. 2 is a transverse sectional view of the construction shown in Fig. 1, being a view taken as indicated by line 2—2 on Fig. 1.

Fig. 3 is a sectional view of a film handling mechanism embodying this invention showing another form and application of the invention.

Fig. 4 is an enlarged detail transverse sectional view of the construction shown in Fig. 3, being a view taken as indicated by line 4—4 on Fig. 3.

Fig. 5 is a detail sectional view taken as idicated by line 5—5 on Fig. 4, and

Fig. 6 is a detail sectional view taken as indicated by line 6—6 on Fig. 4.

My invention provides primary film guiding means comprising a plurality of guiding parts spaced apart longitudinally of the film and spaced apart laterally of the film; the lateral spacing being just sufficient to allow free passage of the film straight through the guide, the film being unconfined laterally at said parts in directions away from the parts.

The longitudinal spacing of the guide parts, which parts may be set or fixed in position, causes the film to be engaged and guided through a substantial portion of its length while the lateral spacing of the guide parts, which is such as to just freely pass the film, maintains the film in a flat plane through the device. The fact that the film is unconfined opposite the guide parts accommodates irregularities such as patches, or the like, allowing them to be admitted through the device upon flexure of the film as they pass the fixed guide parts. In accordance with the principles of my invention the guide parts are definitely and positively fixed against approaching or bearing against the film to pinch the film or establish frictional engagement with it.

In the form of the invention illustrated in Figs. 1 and 2 are the drawing there is an aperture plate 10 having a finished flat face 11 along which the film F may be operated, and a fixed guide part 12 spaced from the face 11 a distance sufficient to allow the film F to just freely pass between the face 11 and the guide in a flat plane parallel with the face 11. A recess 13 is provided in the face 11 opposite the guide part 12 dividing the face 11 into two parts A and B spaced longitudinally of the film F and each spaced longitudinally from the guide 12. The recess 13 is of sufficient extent longitudinally of the film to freely pass an irregularity in the film; a patch in the film can pass between the two parts of the face 11 and the guide part 12, the recess being sufficiently deep to form sufficient clearance or relief in a direction away from the guide part 12 to allow free movement of a patch past the guide part 12.

In the construction illustrated the guide part 12 is fixed in position being in the form of a roller carried on an axle 14 mounted in fixed position. It is desirable in some cases to handle a film without engaging its active or image carrying areas, and therefore the surface 11 of the aperture plate may be suitably relieved and the roller guide 12 correspondingly relieved so that the film is engaged only at its edges or perforated marginal portions.

In the particular arrangement of parts shown in Figs. 1 and 2 of the drawing the aperture 20 in the plate 10 is formed adjacent the parts just described. It is desirable in this case to further guide the film at or opposite the aperture 20. In the drawing I have shown guides 21 located in fixed position opposite the aperture 20 and spaced from the face 11 just far enough to allow free passage of the film between the plate 10 and the guides 21. Recesses 21a are provided in the plate opposite the guides 21 to operate similar to the recess 13 opposite the guide 12.

In the construction shown the guide parts 21 are mounted so that they are operable as a gate to be moved away from the face 11. In the drawing I have shown the guide parts 21 carried on a hinged gate or frame 24 adjustably supported in spaced relation with reference to the face 11 through a stud 25 projecting from the plate 10. The stud carries an adjustable stop member 26 limiting movement of the member 24 toward the plate 10. A spring 27 is carried on the stud 25 between the outer part of the member 24 and an adjustable stop 28. This spring allows the member 24 to move away from the plate if necessary. In the drawing I have shown a film feeding sprocket 30 arranged to advance or operate the film F through the guide.

In Figs. 3 to 6 inclusive I illustrate another form of film handling mechanism including my invention. In this case I have disclosed the present invention applied to a mechanism embodying the principles set forth and claimed in the above-mentioned co-pending applications. The construction includes three aperture plates 10a arranged with reference to a single central film operating sprocket 30a. The film is fed or directed into the mechanism over a roller 40, has looped or strained parts 41 between adjacent aperture plates, and passes from the mechanism over a roller 42. The rollers 40 and 42 and the looped parts 41 of the film between adjacent planes cause the film to be urged outwardly or away from the faces 11a of the aperture plates.

The film guiding means provided by my invention may be applied to each of the aperture plates 10a and may be the same in each case and therefore a detail description of the construction at one of the aperture plates 10a will apply to them all.

The film guiding parts provided by my invention are in this case located and relate with reference to the film F in the same general manner as above set forth. The aperture plate 10a is provided with a raised or projecting part 12a which operates as a fixed film guiding part holding the film away from the face of the aperture plate. Stationary longitudinally spaced film guiding parts C and D are arranged to engage the other or outer face of the film, are located in opposite directions from the part 12a longitudinally of the film, and are laterally arranged with reference to the film F from the part 12a a distance just sufficient to allow the film F to pass freely between them and the part 12a in a flat plane.

In the particular construction illustrated the parts C and D are preferably divided so that each has two portions engaging the margins of the film. The parts C and D are shown carried on a movable gate 50 adapted to be latched in operating position and releasable from operating position to allow the film to be conveniently threaded into the mechanism. The projecting film guiding part 12a on the aperture plate 10a is preferably divided to engage only the marginal portions of the film. In the particular form of construction illustrated the guide part 12a at one side, or engaging one margin of the film may be integral with or a part of the aperture plate while the projecting part 12a engaging the other margin of the film may be the outer or peripheral surface of the film handling sprocket 30a. This relationing of parts is clearly illustrated in Figs. 4, 5 and 6 of the drawing. The projecting guide parts 12a hold the film F away from the face 11a of the aperture plate keeping it in a truly flat plane between the spaced guide parts C and D. The space or recess occurring between the parts C and D and opposite the guide parts 12a permits an irregular part such as a patch in the film to pass the guide parts 12a; the parts C and D being spaced from the face 11a a distance equalling the amount the parts 12a project from the plate plus the thickness of the film leaves a space between the parts C and D and the face 11a of the aperture plate to pass irregular parts of the film. From examination of Fig. 4 of the drawing it will be obvious how a patch in the film will readily pass through the guide means, the passage around or over the guide parts being allowed by the clearance or spaces opposite the several guide parts and by the flexibility of the film. The film carrying rollers 40 and 42 and the loop parts 41 of the film cause the film to bear outwardly or against the guide parts C and D so that there is a tendency for the film to bow between the parts C and D in the direction of the aperture plate 11a. The guide parts 12a engage the film holding it away from the aperture plate at a point between the parts C and D so that it is in a flat plane between the parts C and D. In the particular case illustrated the film is further guided at the outer or end aperture plates by guide parts or rollers 80 cooperating with spaced parts 12b and 12c of the plate to guide the film in accordance with the principles of my invention.

From the foregoing description it will be apparent that my invention provides a film guiding construction wherein the film is accurately and effectively handled without the use of spring actuated pressure shoes or other means bearing on the film to cause it to drag or to be clamped. The invention thus provides a guide arrangement which permits the film to pass through it with a very small amount of friction, thus minimizing wear and injurious effects on the film.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. In combination, two angularly related film guides carrying a film with a free loop part between the guides, each guide including spaced relatively fixed film engaging parts in spaced parallel planes engaging the film at points spaced longitudinally thereof, the spacing of said planes being substantially equal to the thickness of the film.

2. In combination, an aperture plate and a film guide at the aperture plate including spaced relatively fixed film engaging parts in spaced parallel planes for engaging the opposite sides of the film, the said parts being spaced apart to engage the film at points spaced longitudinally thereof and so that the film is unconfined opposite each of said points.

3. In combination, an aperture plate and a film guide at the aperture plate including spaced relatively fixed film engaging parts in spaced parallel planes for engaging the opposite sides of the film, the spacing of said planes being substantially equal to the thickness of the film, one of said parts being a roller, the said parts being spaced apart to engage the film at points spaced longitudinally thereof and so that the film is unconfined opposite each of said points.

4. A film guide including, spaced relatively fixed film engaging parts in spaced parallel planes for engaging the opposite sides of the film, the spacing of said planes being substantially equal to the thickness of the film, the said parts being related and spaced apart to engage the film at points spaced longitudinally thereof and so that the film is unconfined opposite each part, the guide including a plate having spaced parts forming two of said film engaging parts.

5. A film guide including, spaced relatively fixed film engaging parts in spaced parallel planes for engaging the opposite sides of the film, the spacing of said planes being substantially equal to the thickness of the film, the said parts being related and spaced apart to engage the film at points spaced longitudinally thereof and so that the film is unconfined opposite each part, the guide including a plate having spaced parts forming two of said film engaging parts, and a roller having a relatively fixed axis of rotation forming another of said parts.

In witness that I claim the foregoing I have hereunto subscribed my name.

WALTER L. WRIGHT.